United States Patent [19]

Pramann

[11] 3,709,298
[45] Jan. 9, 1973

[54] SAND PACK-AIDED FORMATION SAND CONSOLIDATION
[75] Inventor: James A. Pramann, Metairie, La.
[73] Assignee: Shell Oil Company, New York, N.Y.
[22] Filed: May 20, 1971
[21] Appl. No.: 145,149

[52] U.S. Cl. ................................ 166/276, 166/295
[51] Int. Cl. ................ E21b 43/02, E21b 33/138
[58] Field of Search.............. 166/276, 278, 295, 294

[56] References Cited

UNITED STATES PATENTS

| | | | |
|---|---|---|---|
| 2,288,556 | 6/1942 | Vollmer | 166/276 |
| 2,674,323 | 4/1954 | Cardwell | 166/276 |
| 2,823,753 | 2/1958 | Henderson et al. | 166/276 X |
| 2,986,538 | 5/1961 | Nesbitt et al. | 166/276 X |
| 3,285,339 | 11/1966 | Walther et al. | 166/295 |
| 3,294,166 | 12/1966 | Havenaar et al. | 166/295 |
| 3,327,783 | 6/1967 | Ayers | 166/276 X |
| 3,404,735 | 10/1968 | Young et al. | 166/295 |
| 3,476,189 | 11/1969 | Bezemer et al. | 166/295 |
| 3,548,942 | 12/1970 | Terry | 166/276 |
| 3,621,915 | 10/1969 | Bruist et al. | 166/276 |

Primary Examiner—Stephen J. Novosad
Attorney—H. W. Coryell and Harold L. Denkler

[57] ABSTRACT

In treating a cased and perforated well to prevent sand inflow, a resin solution from which self-curing epoxy resin is subsequently precipitated is injected into the reservoir and the perforated interval of the casing is filled with grains suspended in and permeated with the resin solution. The resin is allowed to precipitate and cure in the casing and reservoir and at l east a portion of the consolidated mass of grains that is formed within the casing is drilled-out.

5 Claims, 2 Drawing Figures

J. A. Pramann
INVENTOR

SAND PACK-AIDED FORMATION SAND CONSOLIDATION

BACKGROUND OF THE INVENTION

This invention is a well treatment for preventing an inflow of sand. It is particularly suitable for use in wells that have been cased and perforated within reservoirs which are, or may become, unconsolidated.

In respect to "sand inflow" or "packing sand or gravel" the terms refer to solid particles that have a sand or gravel size range and are composed of glass beads, silica, quartz, walnut shells, portions of reservoir formation grains and/or cementing materials, or substantially any solid particles that may be used to restrain the inflow of formation grains or may comprise the grains of an unconsolidated reservoir formation.

Previously proposed sand controlling treatments for cased and perforated wells have included procedures such as:

Coating packing grains with a self-curing epoxy resin material, suspending the coated grains in a compatible liquid having only a limited miscibility with the resin solvent, and pumping the suspension into the well to pack the coated grains in the perforation tunnels and associated voids within the reservoir (or, if desired, to pack them around a screen or liner within the borehole) to form a resin-consolidated mass, as described in a copending patent application by E. H. Bruist, T. W. Hamby, T. A. Simon and R. N. Tuttle, Ser. No. 867,631, filed Oct. 20, 1969 now U.S. Pat. No. 3,621,915;

Pumping in a slurry of resin-coated grains, such as those described above, through a well a conduit having a discharge opening that is raised from near the lowermost to near the uppermost perforation while using flow rates and rates of raising the discharge opening such that a fluidized bed of coated grains is formed near each perforation, as described in a copending patent application by T. A. Simon and R. S. Torrest, Ser. No. 82,925, filed Oct. 20, 1970;

Pumping in a slurry of resin-coated grains, such as those described above, in an amount that is correlated with the volume of the perforated interval of casing and associated voids within the reservoir in order to form a pack of the coated grains within the casing and the voids that extends from below to above the perforated interval, and subsequently drilling-out the resin-consolidated mass of grain that is formed within the casing, as described in a copending patent application by J. M. Waid, Ser. No. 121,191 filed Feb. 3, 1971;

Injecting a substantially solids-free resin solution from which a self-curing epoxy resin material is subsequently precipitated into the reservoir and maintaining it substantially static to allow the resin to be precipitated and the reservoir formation to be consolidated in situ, as described in U.S. Pat. No. 3,294,166 by I. Havenaar and F. H. Meys; and Pumping into the well a substantially solids-free resin solution from which a self-curing epoxy resin material is subsequently precipitated, substantially as described above, in a volume and manner such that the resin solution permeates the near well portion of the reservoir and fills the casing from below to above the perforated interval, maintaining the solution substantially static until the resin precipitates and cures, and removing any resin coated granular materials that might impede the passage of tolls or equipment within the casing, as described in a copending patent application by J. M. Waid, Ser. No. 134,782, filed Apr. 16, 1971.

In cased and perforated wells, the permeabilities of the perforations tend to be different. Some of the perforations open into reservoir portions of higher or lower permeabilities and some are temporarily plugged by debris (such as that from the perforating materials or equipment or the well casing or cement) or the like. A well treatment in which a suspension of resin-coated grains is flowed through the perforations tends to form a resin-consolidated sand pack in and around only the most permeable perforations while providing little or no protection against slumping or collapsing within the unconsolidated reservoir formation around a plugged or low permeability perforation. This may allow a subsequent casing deformation and destruction of the consolidated granular masses that were formed near the open perforations. A well treatment in which a substantially solid-free resin solution is injected into the pores of the reservoir formation tends to consolidate the formation near the most open perforations while providing little or no consolidation around plugged perforations leaving voids within the reservoir. This may allow a subsequent reservoir slumping and casing deformation accompanied by a destruction of the grain interbonding in the consolidated portions of the reservoir. If such an injection of resin solution is preceded by a sand and/or gravel packing treatment, the packing grains tend to be deposited in the voids around the open perforations, but the subsequently injected sand consolidating fluid tends to redistribute the packing grains and reopen the voids. In addition, if a mass or column of sand or gravel is deposited in the well before the resin solution is injected, most of the resin solution tends to enter the upper perforations, via flow paths involving the least travel through the sand or gravel.

SUMMARY OF THE INVENTION

In accordance with this invention a sand controlling treatment of a cased and perforated well in a reservoir that is (or is apt to become) unconsolidated is improved by permeating the adjacent portions of the reservoir with a resin solution that subsequently precipitates a self-curing epoxy resin, filling the interior of the perforated portion of the casing and associated perforation tunnels and voids within the reservoir with a mass of packing grains that is permeated with the resin solution, allowing the resin solution to remain static while the resin precipitates and cures, and, subsequently, drilling out a portion of the consolidated mass of grains that is formed within the casing.

This invention is at least in part premised on the discovery that such a resin solution can be displaced through a well conduit ahead of a portion of resin solution containing suspended packing grains and disposed within the well and the surrounding portion of the reservoir so that the resin solution-permeated grains are packed into the formation voids, perforation tunnels, and perforated interval of casing adjacent to the solids-free resin solution that has been injected into the reservoir — without causing an economically unfeasible amount of the resin solution to be injected.

Resin solutions can be utilized as carrier fluids for the packing grains at pumping rates that can be attained without fracturing the reservoirs being treated. The subsequent precipitation and curing of the resinous material forms a substantially continuous resin-consolidated mass of injected grains and reservoir formation grains that extends from within the perforated interval of casing to within the surrounding portion of the reservoir. The drilling out of a portion of the consolidated mass of grains within the casing always leaves at least a portion of such a consolidated mass of grains that extends from within the reservoir and through the perforation tunnels to the inner diameter of the casing.

In a preferred embodiment of the invention, the injection of packing grain-carrying resin solution is preceded by the running in of a centered drillable structure that extends along the perforated interval of the casing and is substantially hollow, or has a low resistance to being drilled along its center, and is arranged to contain and guide a pilot portion of a bit or mill for drilling out such materials. The drilling out of only a central non-gauge portion of the mass resin consolidated grains that extends from within the reservoir to within the casing (by guiding a non-gauge drilling means along the central portion of the drillable structure within the perforated interval) ensures an effective sand control even though neither the resin solution nor resin solution-suspended packing grains have entered into all of the perforations.

DESCRIPTION OF THE INVENTION

Figure 1:
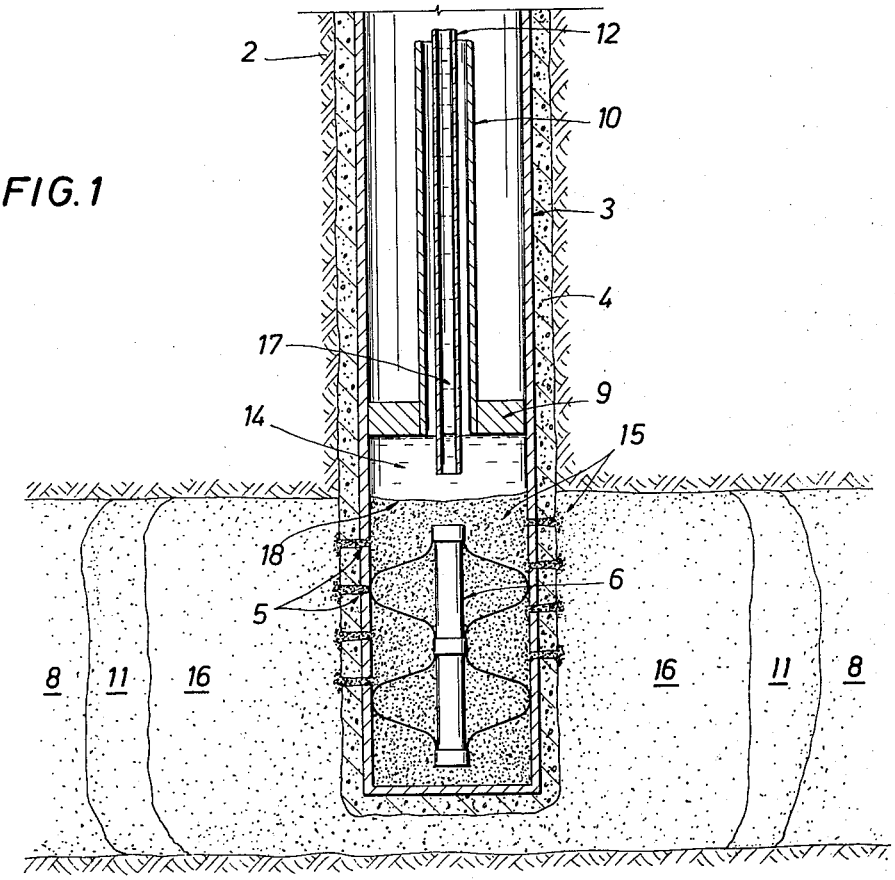
FIG. 1 is a schematic partially cross-sectional view of a well being treated in accordance with this invention.

FIG. 1 shows a portion of a well including borehole 2 and casing 3, which is surrounded by cement 4 and penetrated by perforations 5. The casing contains a string of tubing 10 which is surrounded by packer 9 and penetrated injection tubing string 12. A centralized closed hollow tube 6 of a drillable material such as aluminum has been run-in and centered within the perforated interval of the casing.

At the stage shown in FIG. 1, pretreatment fluids 11 and resin solution 16 have been injected into the reservoir formation 8 around the perforated interval of casing. The perforated interval of casing and associated perforation tunnels and voids within the reservoir formation have been packed with packing material grains 15 to form a mass of contiguous grains which is permeated by the resin solution 16. The resin solution extends above the mass to an interface 18 between the resin solution 16 and a spacer fluid 14 which was displaced through tubing 12 ahead of a displacement fluid 17. At the stage shown in FIG. 1, the fluids are being kept stationery while resinous material is being precipitated from resin solution 16 and cured to interconnect the packing material grains 15 and the grains of the reservoir formation 8 into an integral permeable mass 15a (FIG. 2) of resin-consolidated grains.

Figure 2:
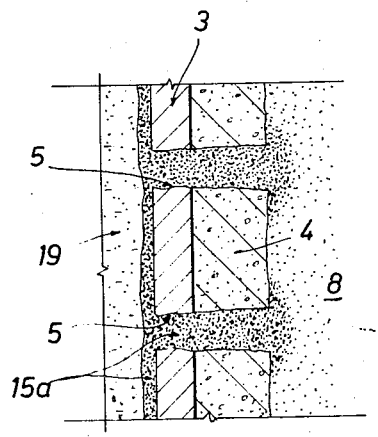
FIG. 2 is a similar illustration of an enlarged portion of the materials shown in FIG. 1.

In FIG. 2, a portion of the consolidated mass of grains and the centralized drillable structure 6 have been drilled out to leave a central portion of the interior of casing 3 filled with drilling fluid 19 and an annular ring of the mass of consolidated grains 15a.

The above materials and the procedures for their installation or use within a well can involve materials and techniques known to those skilled in the art.

The pretreatment fluids and resin solutions are preferably materials of the types described in U.S. Pat. No. 3,294,166 and 3,476,189. Such resin solutions deposit self-curing epoxy resin materials in the grain-to-grain contacts between a mass of contiguous grains, by means of phase separation and capillarity. To enhance this action the grains and/or reservoir sand should be oil-wet. The injection of the resin solution is preferably preceded by three pre-flushes. The first is preferably a light oil, such as diesel oil, that displaces residual crude oil, substantially fills the pores, and reduces the water saturation to a residual water saturation. The next is an oil and water miscible material, such as isopropyl alcohol, which displaces both the previously injected oil and the residual water. The mutually miscible solvent is then displaced with the medium range oil that tends to leave the formation oil-wet and to displace the mutually miscible solvent so that it will not come into contact with the resin solution and accelerate the curing of the resin. The injected resin solution preferably contains about 18 per cent resin forming components and about 82 percent solvent. When the partially polymerized resinous materials are precipitated, they are the wetting phase and capillarity draws these materials into the grain-to-grain contacts where the resinous materials are held until they harden. In general, the result is a consolidated mass in which the central portion of the pore spaces between the grains is filled with solvent.

The packing grains can be substantially any type of hard particles having a size such that they form a sand pack which is permeable to an inflow of fluid but impermeable to substantially all of the formation grains. The exclusion of the formation grains is important and is preferably accomplished by using relatively well-rounded packing grains that have a generally spherical shape and a relatively narrow range of grain sizes with a median grain size which is not more than about 7 times larger than the median size of the grains in the reservoir formation.

In the present process, the packing grain size is preferably correlated with the formation grain size, as described above, to provide a pack that excludes substantially all particles of the reservoir grain sand. This correlation is distinctively different from a procedure, such as that described in U.S. Pat. No. 3,548,942, in which a bed of relatively coarse particulate material is deposited in the well bore adjacent to the formation prior to injecting the solutions employed for sand consolidation purposes. Such beds through which the resin solutions are injected are used to provide large surface areas on which films of pre-polymerized resin can be accumulated without plugging the pore spaces through which the sand consolidating material solutions must pass into in the perforations and the surrounding formations. Such large particle beds have been used to avoid problems encountered in sand control techniques involving first injecting a curing agent-free resin solution into the incompetent formation, flushing the formation with an inert fluid to distribute and displace the resin solution and, subsequently, injecting a catalyst. In such procedures gummy resinues tend to be formed by the inneraction of the catalysts or curing agents with small amounts of the resinous materials that adhere to the tubing wall and are not swept away by the inert flushing agent. The beds strain out the gummy particles before they reach the reservoir sand.

In the present process, masses or beds of grains are deposited within the well only after the resin solutions have entered the surrounding reservoir. This avoids the effects of the bed permeabilities on the amounts of resin solution that enter differently located perforations. In addition, in the present process, the beds of grains are uniformly permeated with a solution of self-curing resin forming ingredients and are uniformly bonded together by the uniform deposition and curing of such ingredients.

In the suspending of packing grains in the resin solution and injecting the suspension into the well in accordance with the present process, the initial portions of resin solution can contain little or no suspended sand. However, particularly in a remedial operation in a well from which a significant amount of formation sand has been entrained in fluids flowing into the well to leave one or more voids within the reservoir, a significant amount of packing sand may be desirable to pack each void.

In the present process, resin solution is commonly formulated and injected in "units" of 100 gallons per foot of perforated interval and the rates of pumping are to some extent controlled by the injection pressure that can safely be applied without fracturing the reservoir. In numerous unconsolidated reservoirs one unit of resin solution permeates a zone around the well having a radius in the order of 3 feet. Where a significant amount of sand is needed to pack relatively large voids, sand is preferably suspended in the initial portion of the suspension but then are preferably kept relatively dilute, with the concentrations increasing with time until the later injected portions are relatively concentrated. When the last portions of resin solution-suspended grains have been displaced through a well conduit to near the perforated zone, the fluid flow rate is reduced to cause a "sand-out" or deposition of the entrained sand.

EXAMPLE I - WELL TESTS

The well to be treated was completed with a perforated 5½ inch casing in a 5 foot sand interval in which an initial in situ sand consolidation, with an injected resin solution from which a self-curing epoxy resinous material was subsequently precipitated, had failed. Ten units of a resin solution of the preferred type described above were used with 15 sacks (100 pound sacks) of 0.017 inch by 0.033 inch gravel being blended in the last five units with a continuous proportioner. The initial portions of the resin solution were injected at a rate of about 1 bpm (barrels per minute) and a sand-out was achieved, when the latter portions were near the perforated interval. The sand-out was achieved by reducing the pump rate to about one-fourth bpm (i.e., in response to an injection pressure of 3,000 psi). The resin solution was maintained substantially static to allow resin material to be precipitated and cured. The top of the gravel was found to be about 67 feet above the top of the perforations. The gravel was drilled out at a rate of 2½ feet per minute with 5,000 pounds weight on the bit of a conventional drill string assembly. In tests conducted after the treatment, the well was flowing 176 barrels per day of oil with 19 per cent water (5,682 gas-oil ratio and 1,350 psi tubing pressure) with a trace of sand.

The present process can be used in conjunction with a fluidized bed slurry injection procedure such as that described and claimed in the Ser. No. 82,925, filed Oct. 20, 1970 copending patent application referred to above. In such a procedure, an injection tubing string, such as tubing 12, is extended into the well bore to near the bottom of the interval to be packed and the slurry of the packing materials in the resin solution is pumped through the tubing string while the string is being raised at a rate correlated with the pumping rate to maintain a fluidized bed of packing material around the end of the tubing string as it moves through the interval to be packed.

What is claimed is:

1. In a sand control treatment in which a resin solution from which self-curing epoxy resin material is subsequently precipitated is pumped through a well conduit in a cased and perforated well and is injected into the adjacent reservoir formation, the improvement comprising:

suspending grains in at least a portion of the resin solution, with said grains having a size adapted to form a pack that prevents an inflow of reservoir formation grains;

pumping the resin solution and suspended grains through the well conduit so that a portion of the reservoir formation is permeated by the resin solution and the suspended grains are packed into a resin solution-permeated mass of grains that extends as a substantially continuous mass of contiguous grains from below to above the perforated section within the casing, extends through the perforations in the casing wall, extends into and fills voids within the adjacent reservoir formation, and extends into contact with the adjacent portions of the reservoir formation;

maintaining the resin solution substantially static within the well and the reservoir until the resin material has precipitated and cured; and drilling out at least a portion of the resultant resin-consolidated mass of grains that is formed within the casing.

2. The process of claim 1 in which:

a drillable structure adapted to guide a drilling means is centered within the casing along the perforated interval prior to the pumping in of the suspended grains; and a non-gauge portion of the consolidated mass of grains within the casing is drilled out by guiding a drilling means along said drillable structure.

3. The process of claim 1 in which the median size of said packing grains is not more than about 7 times that of the reservoir formation grains.

4. The process of claim 1 in which the grain suspending slurry is injected through a tubing string having a discharge location that is raised from near the bottom to near the top of the perforated interval at rates correlated with the injection rate to form a fluidized bed of particles in and around each of the perforations.

5. A well treatment which comprises:

injecting resin solution from which self-curing epoxy resin material is subsequently precipitated through the perforation tunnels of a perforated section of well casing and into an adjacent substantially granular reservoir formation;

suspending in said resin solution grains having a size adapted to form a pack which excludes the entry of any sand grains from the reservoir formation;

pumping said suspension into said perforated section of casing so that the suspended grains are deposited to form a substantially continuous mass of contiguous grains extending from within the casing and throughout the perforated interval to within the adjacent reservoir formation;

correlating the volume and disposition of said resin solution so that it extends as a continuous body of grain-permeating fluid throughout said substantially continuous mass of sand and an adjacent portion of said reservoir formation;

maintaining said resin solution substantially static to cause said resin material to precipitate and cure; and drilling out at least a portion of the resultant resin-consolidated mass of grains that is formed within the casing.

* * * * *